Aug. 26, 1941.  C. H. DESAUTELS  2,253,896
MACHINE FOR MAKING TIRE CASINGS
Filed Jan. 10, 1939  8 Sheets-Sheet 1

INVENTOR
CHARLES H. DESAUTELS
BY
Chapin & Neal
ATTORNEYS

Aug. 26, 1941. C. H. DESAUTELS 2,253,896
MACHINE FOR MAKING TIRE CASINGS
Filed Jan. 10, 1939 8 Sheets-Sheet 3
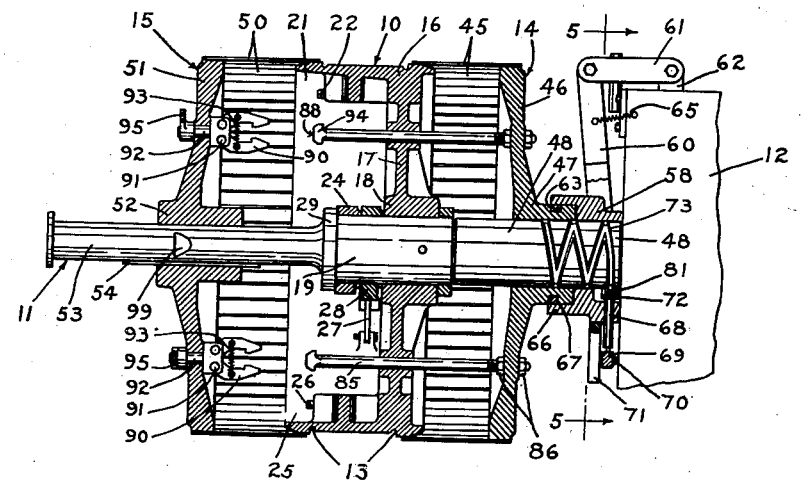
Fig. 3
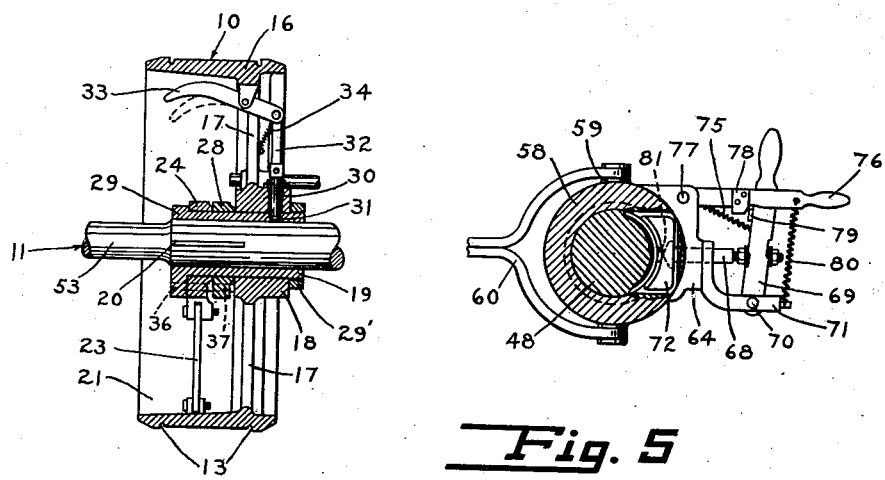
Fig. 4
Fig. 5
INVENTOR
CHARLES H. DESAUTELS
BY
Chapin & Neal
ATTORNEYS Aug. 26, 1941.   C. H. DESAUTELS   2,253,896
MACHINE FOR MAKING TIRE CASINGS
Filed Jan. 10, 1939   8 Sheets-Sheet 4

INVENTOR
CHARLES H. DESAUTELS
BY Chapin & Neal
ATTORNEYS

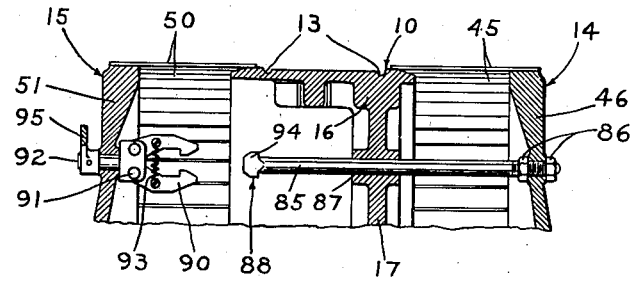
_Fig. 12_
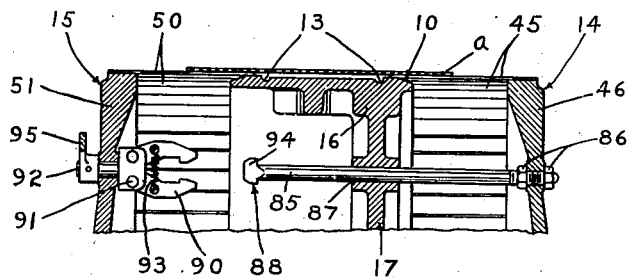
_Fig. 13_
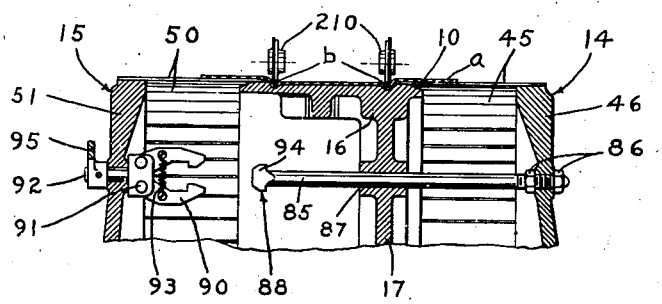
_Fig. 14_
INVENTOR
CHARLES H. DESAUTELS
BY Chapin & Neal
ATTORNEYS Aug. 26, 1941.    C. H. DESAUTELS    2,253,896
MACHINE FOR MAKING TIRE CASINGS
Filed Jan. 10, 1939    8 Sheets-Sheet 6

INVENTOR
CHARLES H. DESAUTELS
BY Chapin & Neal
ATTORNEYS

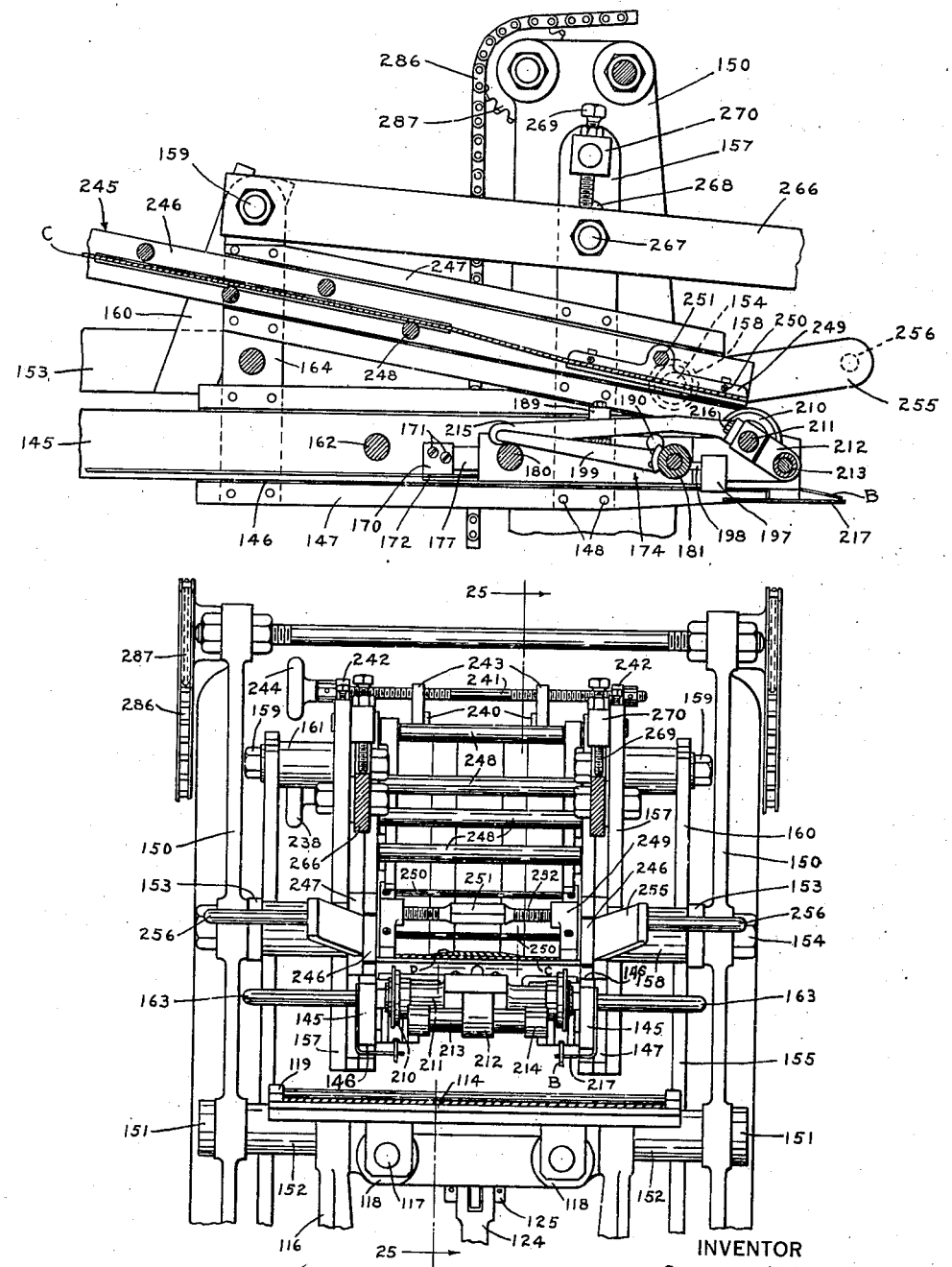

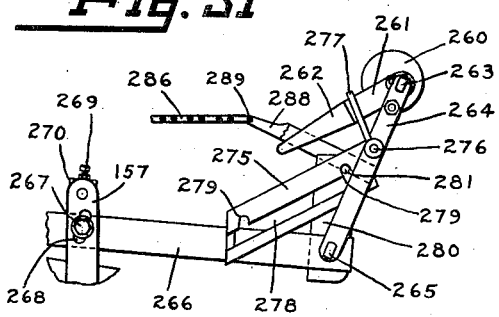
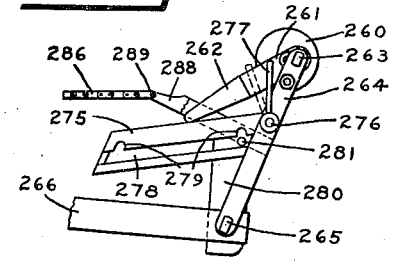
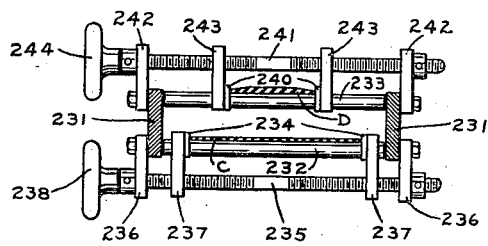
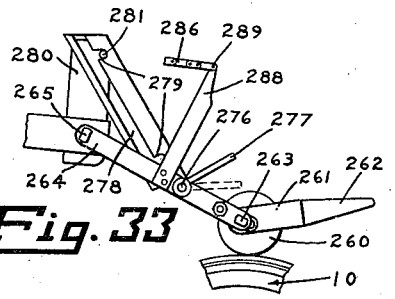
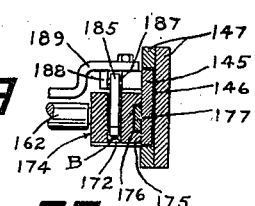
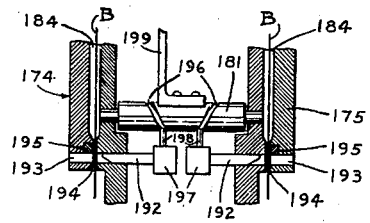
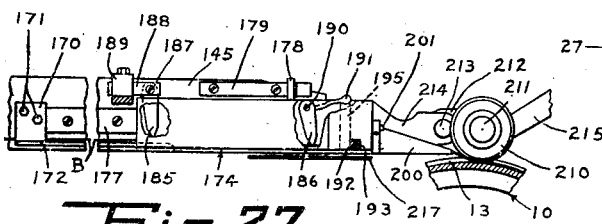
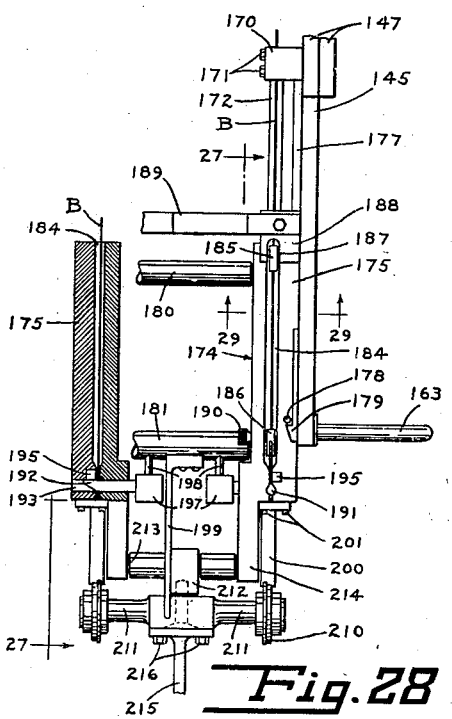

Patented Aug. 26, 1941

2,253,896

UNITED STATES PATENT OFFICE 2,253,896

MACHINE FOR MAKING TIRE CASINGS

Charles H. Desautels, Springfield, Mass., assignor, by mesne assignments, to United States Rubber Company, New York, N. Y., a corporation of New Jersey Application January 10, 1939, Serial No. 250,153

6 Claims. (Cl. 154—10)

My invention relates to machines for constructing pneumatic tire casings. It is particularly adapted for the construction of bicycle tire casings, and in the accompanying drawings and following specification I have illustratively disclosed the invention as embodied in a machine for that purpose. It will be understood, however, that the principles of the invention are applicable to other tires of similar structural design.

It is the principal object of my invention to provide a machine by which the casing can be completely constructed with a minimum of reliance on the personal equation of the operator and in a more expeditious manner than is possible with prior machines. By my invention a higher and more uniform quality of product is secured with a decrease in unit cost.

Other and further objects will be made apparent in the following specification and claims.

Figure 1:
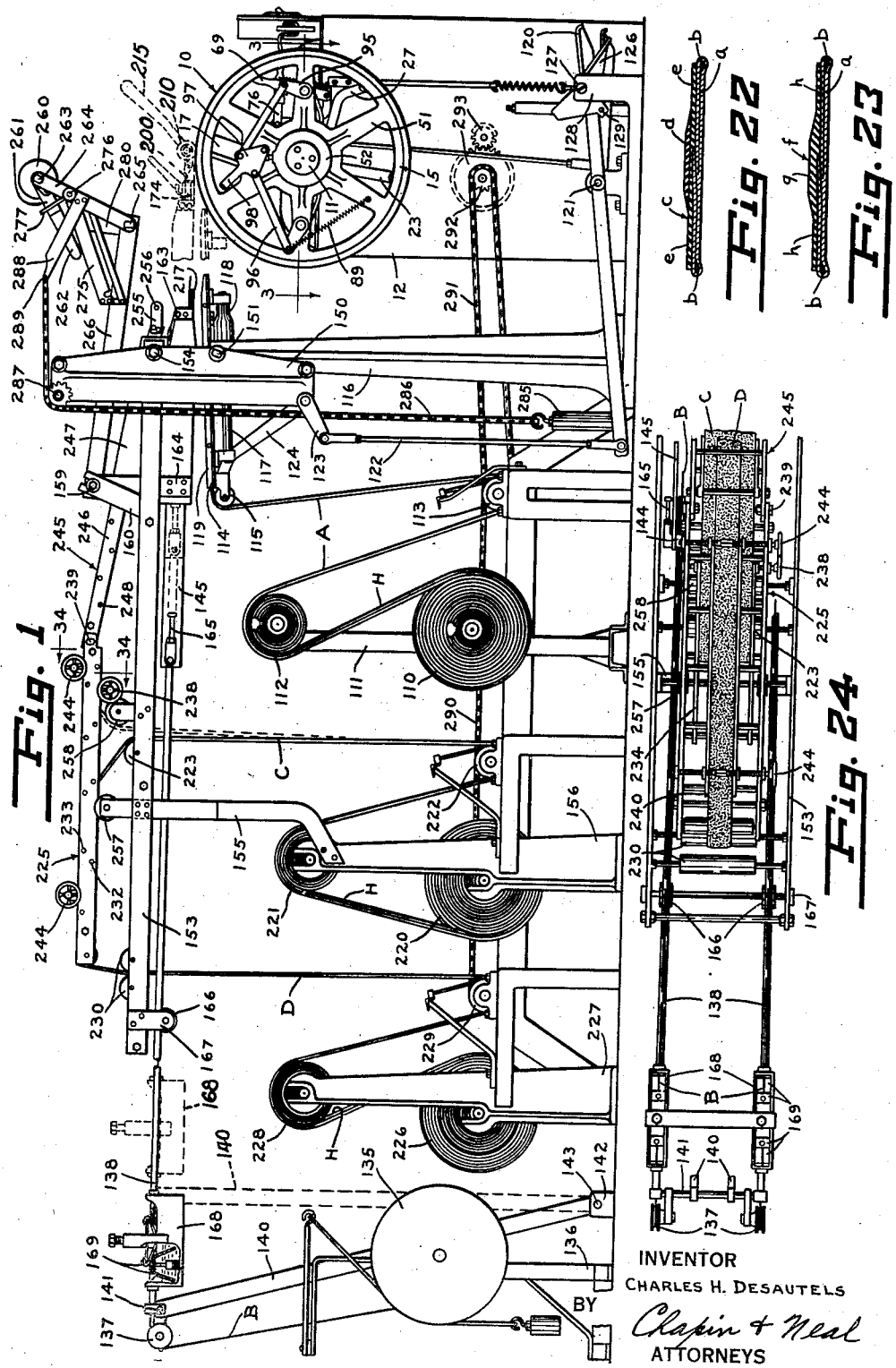

In the accompanying drawings:

Fig. 1 is a side elevational view of a machine constructed in accordance with my invention.

Figure 2:
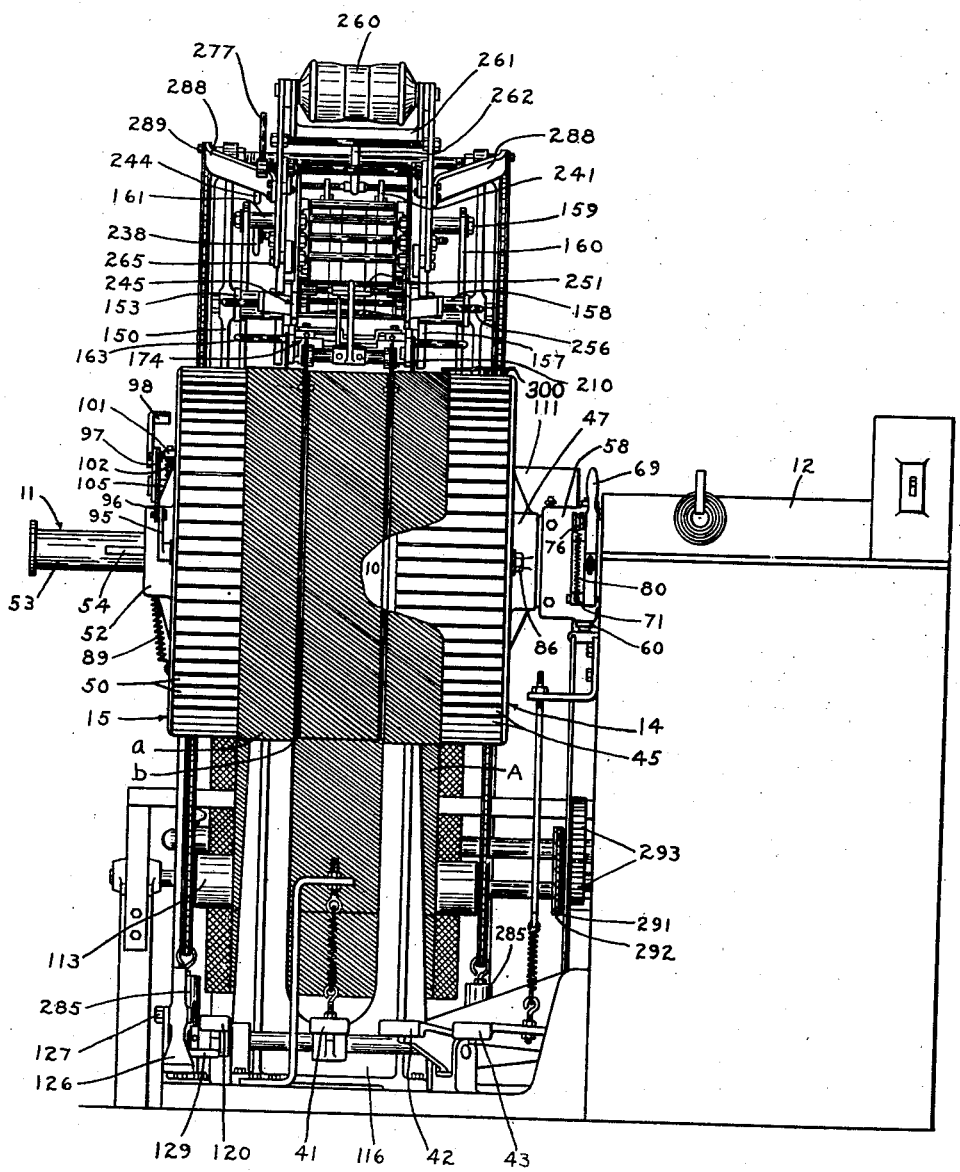
Figure 6:
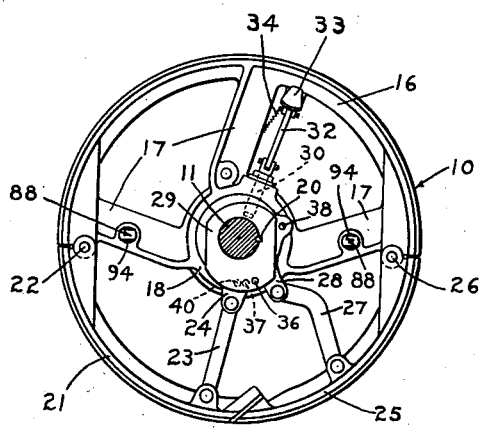
Figure 9:
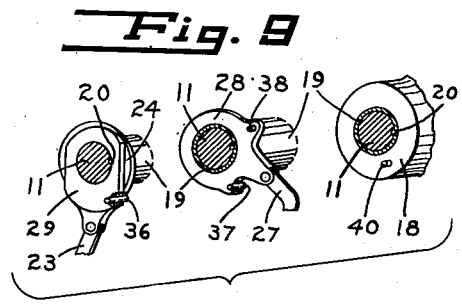
Figure 7:
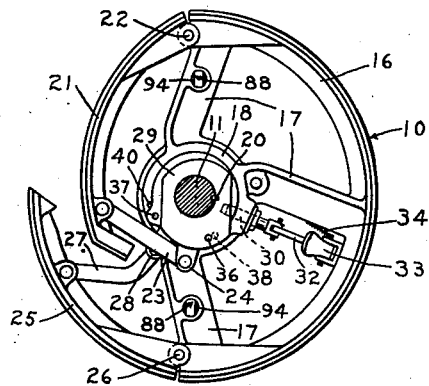
Figure 10:
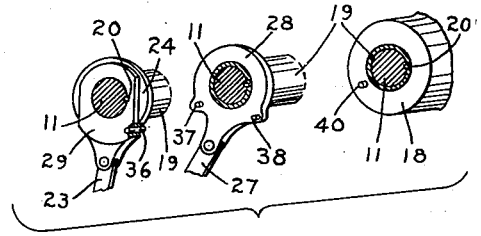
Figure 8:
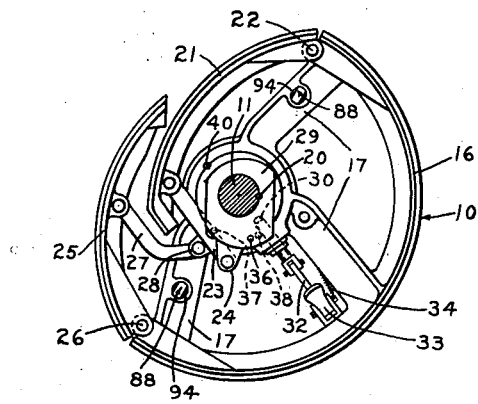
Figure 11:
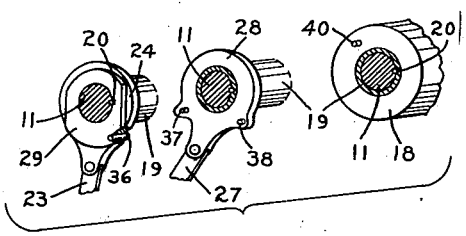
Figure 15:
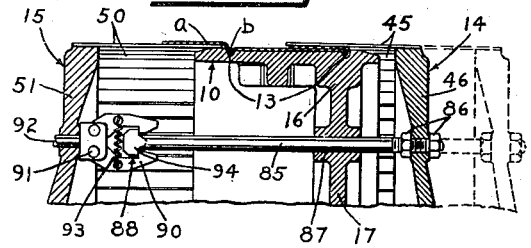
Figure 18:
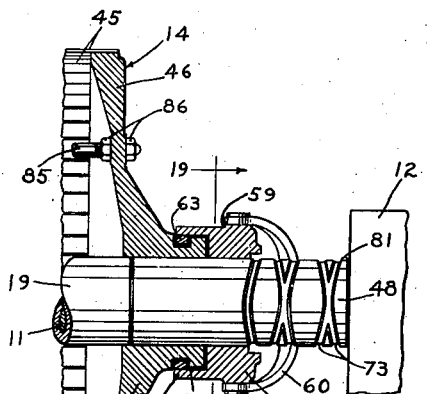
Figure 19:
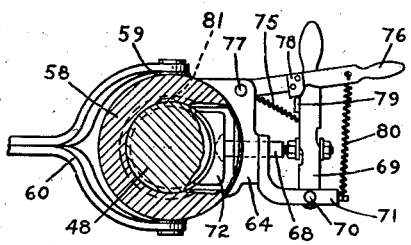
Figure 21:
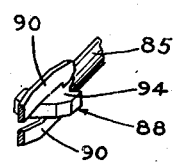
Figure 20:
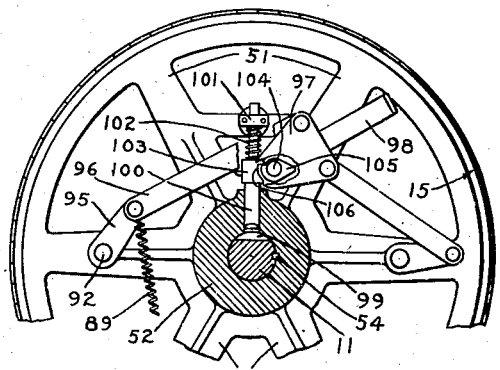

Fig. 2 is a front elevational view (looking from the right of Fig. 1), a partially constructed casing, with parts broken away, being shown on the drum, Fig. 3 is a sectional view of the drum and fabric lappers, and their operating mechanism, substantially on line 3—3 of Fig. 1, Fig. 4 is a similar sectional view of the drum alone but taken on a line at right angles to that of Fig. 3, Fig. 5 is a detail sectional view substantially on line 5—5 of Fig. 3, Figs. 6 to 8 inclusive are end views of the drum showing successive positions of the parts from "set up" or operative position to collapsed position, Figs. 9 to 11 inclusive are "exploded" detail views of the drum collapsing mechanism with the parts in positions corresponding respectively to those of Figs. 6 to 8 inclusive, Figs. 12 to 17 inclusive are fragmentary sectional views of the drum and lappers in the relative positions they occupy during the various stages in the construction of a casing, Fig. 18 is a detail front elevational view of the mechanism operating the lappers when the latter are in the position shown in Fig. 15, Fig. 19 is a sectional view substantially on line 19—19 of Fig. 18, Fig. 20 is an end elevational view, partly in section, showing the means for uncoupling the lappers and the means for limiting outward movement of the outer lapper, Fig. 21 is a detail perspective view showing the lapper coupling means in position for disengagement, Fig. 22 is a sectional view of the uncured tire as built by the machine, Fig. 23 is a similar sectional view showing an alternative form of tread, Fig. 24 is a plan view of the tread guiding means, Fig. 25 is a sectional view substantially on line 25—25 of Fig. 26, on a larger scale than Fig. 2, Fig. 26 is a front elevational view of the delivery portion of the material supply mechanism, Fig. 27 is a detail sectional view substantially on line 27—27 of Fig. 28, with parts broken away, Fig. 28 is a fragmentary plan view of the bead applying device, parts being shown in section, Fig. 29 is a fragmentary sectional view substantially on line 29—29 of Fig. 28, Fig. 30 is a detail plan view, partly in section, showing the bead cutter, Figs. 31 to 33 inclusive are detail side elevational views showing successive positions of the tread applying roll, Fig. 34 is a sectional view, on a larger scale, taken substantially on line 34—34 of Fig. 1.

Referring to the drawings, 10 indicates a drum upon which the elements of the tire casing are assembled and the casing constructed. The drum 10 is mounted upon a driven shaft 11 supported from a housing 12 in any suitable manner and driven from an electric motor or other source of power, not shown, located in the housing. Drum 10 is provided with special head positioning grooves 13, later referred to. Also mounted on the shaft 11, positioned on opposite sides of the drum 10 and concentric therewith are two cylindrical fabric lapping members 14 and 15.

Referring to Figs. 3 to 11 inclusive, the drum 10 is formed in three segments. Segment 16 which may include substantially half of the perimeter of the drum is secured by means of three spokes 17 to a hub 18 rotatably mounted on a sleeve 19 fixed on shaft 11 as by a key 20. Drum segment 21 is hinged to an end of segment 16 as at 22 and is connected by a link 23 to a ring 24 mounted on sleeve 19. The third drum segment 25 is hinged at 26 to the other end of segment 16 and is connected by a link 27 to a ring 28 rotatably mounted on sleeve 19. Hub 18 and rings 24 and 28 are held on sleeve 19 between a flange 29 formed on the outer end of the sleeve and a collar 29' threaded on the opposite end of the sleeve. During the building operation hub 18 is held fixed to sleeve 19 by a pin 30 (see Fig.

4) slidably mounted in the hub and engageable in a recess 31 in the sleeve. Pin 30 is connected by a link 32 to a lever 33. A spring 34 normally keeps pin 30 in engagement with the recess 31 so that the drum rotates with the shaft 11. When lever 33 is moved to the dotted line position shown in Fig. 4 the pin 30 is withdrawn and hub 18 is free to rotate on sleeve 19.

Relative movement between hub 18 and sleeve 19 is employed to collapse drum segments 21 and 25 as shown in Figs. 6 to 11 inclusive. Referring to the latter group of figures, ring 24 is shown pinned to sleeve 19 by a pin 36 which extends through flange 29 and the ring and between two spaced pins 37 and 38 carried by ring 28. Pin 37 extends through ring 28 in position to engage a pin 40 carried by hub 18. When the drum is in operative set up condition pins 40, 37 and 36 are in circumferential contact with each other as shown in Fig. 6.

Assuming, now, that lock pin 30 has been withdrawn to release hub 18 from sleeve 19 and that shaft 11 and sleeve 19 which is keyed thereto are held against rotation, drum 10 is rotated to a position shown in Fig. 7. Hub 18 which is rigidly connected to the drum by spokes 17 moves with drum and ring 28 is carried with it by link 27. During this movement sleeve 19 and the parts secured thereto remain stationary and drum segment 21 is drawn inward due to its connection by link 23 to sleeve 19. At this point pin 38 contacts pin 36, thus preventing further rotation of the ring 28, and in the further rotation of the hub 18 segment 25 is drawn inwardly by link 27, as shown in Fig. 8, which connects segment 25 to the now stationary ring 28. As will be obvious reverse movement of the drum parts relative to sleeve 19 will return the drum to the set up position of Fig. 6. The driving mechanism for shaft 11 which is enclosed in housing 12 includes low and high speeds and suitable brake mechanism, not shown, operated respectively by foot pedals 41, 42 and 43, by which the operator can positively hold the shaft 11 stationary during the drum collapsing operation.

Referring to Fig. 3 the fabric lapping member 14 comprises a plurality of flat members 45 secured at one end to the periphery of a wheel member which includes spokes 46 extending from a hub 47 slidably mounted on an enlarged portion 48 of shaft 11. The flat members 45 are positioned closely adjacent each other, as shown in Fig. 2, to form a substantially continuous cylindrical surface. A clip 300 (Fig. 2) is provided on member 14 to assist the operator in holding the fabric on the drum, as later described. Lapping member 15 is constructed similar to member 14 comprising flat members 50 secured to the periphery of a wheel member including spokes 51 secured to a hub 52. Member 15 is slidably but non-rotatably mounted on the reduced end portion 53 of shaft 11 as by a spline 54. During the initial tire building steps the lapping members 14 and 15 are positioned as shown in Fig. 3 with the free edges of cylinders formed by the flat members 45 and 50 slightly overlapping the opposite edges of drum 10, and in effect forming continuations of the drum surface.

Member 14 is adapted to be moved toward drum 10 as shown in Fig. 15 by means of a collar 58 slidably mounted on enlarged shaft portion 48. Collar 58 is pivotally mounted, by trunnions 59, between the arms of a forked guide lever 60 pivoted by means of a link 61 to a bracket 62 secured to the side of housing 12. A spring 65 connected between lever 60 and housing 12 (Fig. 3) tends to keep the collar adjacent the housing. Collar 58 is provided with a longitudinally extending flange 66 to which is fixed a split ring 63 engaging in a groove 67 formed in hub 47 so that member 14 is free to rotate relative to the collar but is constrained to move with it longitudinally on the shaft. Collar 58 is reciprocated on the shaft by means of split ring 63. Slidably mounted in a boss 64 formed on collar 58 is a pin 68 swiveled at its outer end in a lever 69 pivoted at 70 to a bracket 71 carried by the collar. The inner end of pin 68 is provided with a follower head 72 engageable in double grooves 73 of opposite pitch formed in portion 48 of the shaft. When the follower head is engaged in the groove and the shaft is rotated the collar 58 is constrained to travel toward the end of the shaft, moving member 14 to the position of Fig. 15, and upon reaching the end of one groove to return along the other bringing the member 14 back to its initial position. Follower head 72 is normally urged into driving engagement with grooves 73 by a spring 75 but is adapted to be locked in retracted position by a latch arm 76 pivoted to the collar 58 at 77 and having a lug 78 adapted to engage a lug 79 on lever arm 69 to hold the latter in pin retracting position as shown in Figs. 3 and 5. Arm 76 is releasably held in locking position by a spring 80. When latch arm 76 is raised as shown in Fig. 19, pin 68 and lever 69 move inwardly under the influence of spring 75 to cause follower head 72 to engage in grooves 73. Upon return of collar 58 upon the completion of a cycle of operation the follower head 72 rides onto a rounded projection 81 formed on shaft portion 48 at the end of grooves 73, retracting follower head 72 and permitting latch arm 76 to drop into locking engagement with lever 69, thus holding follower head 72 out of engagement with the grooves until again released.

Figure 16:
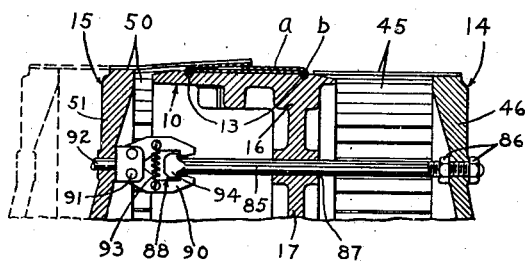

Two diametrically opposite spokes 46 of member 14 are provided with longitudinally extending rods 85 adjustably secured to the spokes by nuts 86. Rods 85 extend through openings 87 formed in spokes 17 of drum 10, constraining member 14 to rotate with the drum. The outer ends of rods 85 are formed with flattened locking heads 88. Two diametrically opposite spokes 51 of member 15 are provided with pairs of hooked locking fingers 90 pivoted at 91 to short shafts 92 journaled in the spokes 51. Fingers 90 are drawn together by springs 93. When member 14 is advanced toward the drum, as previously described, with heads 88 are forced between fingers 90 as member 14 reaches its further point of advance, the springs 93 yielding to permit the fingers to ride over head 88 and causing them to engage behind the head as shown in Fig. 15, thus locking member 15 to member 14. As the member 14 returns to normal position it carries member 15 with it, as shown in Fig. 16. When member 14 comes to rest in its original position member 15 is released therefrom by rotating shafts 92 through an arc of 90°, bringing fingers 90 opposite the flat sides 94 of heads 88 as best shown in Fig. 21, in which position member 15 can be withdrawn. Shafts 92 are provided on their outer ends (Figs. 1 and 20) with arms 95 connected by links 96 to a plate 97 pivoted at 104 to one of the spokes 51 of member 15. Plate 97 is provided with a handle 98 by which the plate may be rocked on its pivot from the position shown in Fig. 1 in which it is normally held by a spring 89, to that of Fig. 20 to rotate fingers 90 from locking to unlocking position.

The initial operating position of member 15 with the cylinder forming member overlapping the edge of the drum as shown in Fig. 3, is defined by a notch 99, formed in shaft 11, into which a pin 100 is adapted to engage. Best shown in Fig. 20 pin 100 is slidably mounted in hub 52 and a boss 101 formed between spokes 51. A spring 102 compressed between boss 101 and a collar 103 secured to the pin, urges the pin into engagement with slot 99.

Figure 17:
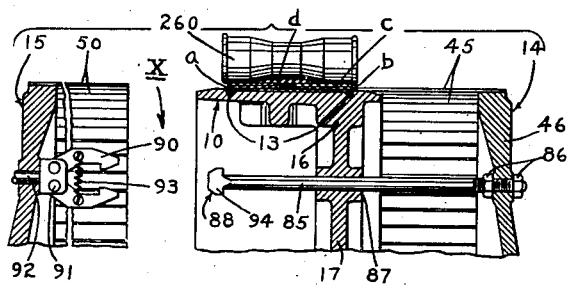

For the purpose of removing the finished tire from the drum as later described, it is necessary to move member 15 on shaft 11 to a point, as shown in Fig. 17 beyond its normal operating position. Pin 100 is withdrawn from slot 99 to permit this by means of a cam member 105 secured to the rear of plate 97 and movable therewith. Cam 105 engages in a recess 106 formed in collar 103 to raise the pin 100 against spring 102 as the plate 97 is swung to the position shown in Fig. 20, in which the fingers 90 are released from heads 88, shown in Fig. 21, so that the operator can by hand withdraw member 15 to the end of the shaft, leaving a space between the drum and member 15.

The tire as constructed by the machine is formed from a length of bias fabric *a*, preferably cord fabric, folded on itself as shown in Fig. 22 to form a two ply tire with inextensible bead members *b* enclosed in the folds. A length of rubber forming the side wall and tread is plied onto the fabric. As shown in Fig. 22 the rubber covering consists of two strips *c* and *d*, the strip *c* being of sufficient width to extend to the bead edges and form the side wall portions *e*. Strip *d* is of a width and shape to form the tread portion, and is applied centrally of the strip *c*. The strips *c* and *d* may be of different color as for example strip *c* may be white and the tread strip black, thus forming a white sidewalled tire. In Fig. 23 the rubber covering is formed in one piece *f*, and is calendered or extruded to a shape to provide a central thickened tread portion *g* and thinner side wall portions *h*.

The materials of which the tire is constructed are advantageously supplied to the drum in web or strip form from which strip the desired amount is severed or otherwise separated after it has been wound in position on the drum. To facilitate this I provide sliding guiding means for the several materials arranged in superposed relation in the order in which the materials are applied to the drum, and each guide being movable from a position remote from the drum to a position of substantial tangency to the drum.

Referring to Fig. 1, the fabric element *a* is supplied in the form of a web A from a roll 110 mounted on a standard 111. The fabric is wound in a liner H in the customary manner, and the liner and fabric are drawn from the roll 110 around a roll 112 upon which the liner is wound, the fabric passing around a driven roll 113 to a fabric guiding table 114, provided at its rear edge with an anti-friction roll 115 over which the fabric passes. Table 114 is slidably mounted between standards 116 (Figs. 1 and 26) by means of rods 117 secured to the underside of the table and sliding in bearings 118 secured to the standards. The table is provided with side members 119 between which the fabric is guided as it is drawn over the table. Table 114 is moved from its retracted position shown in full lines in Fig. 1 to a position closely adjacent and substantially tangent to drum 10 as shown in dotted lines, by means of a foot treadle 120 pivoted at 121 and connected by a link 122 to one arm 123 of a bell crank, the other arm 124 of which is linked as at 125 (Fig. 26) to the underside of the guide table. As will be clear from Figs. 1 and 26, when treadle 120 is depressed the guide table is moved forward to the dotted line position. The treadle 120 is raised to return the guide table to retracted position by a short treadle 126 pivoted at 127 to a bracket 128 and provided with a stud 129 engaging beneath treadle 120.

The inextensible bead material B which is preferably in the form of rubber covered wire, is supplied from a reel or reels 135 mounted on a standard 136 (Fig. 1). The bead wires B, from which the lengths *b* are later cut, are drawn upwardly from reels 135 around guide rolls 137 through pipe conduits 138 which form part of a reciprocating guide mechanism. The rear ends of pipes 138 are supported on arms 140 pivoted at their upper ends to a rod 141 connecting the ends of the conduits, and at their lower ends to blocks 142 at 143. The forward ends of the pipes 138 are secured in blocks 144 (Fig. 24) to the ends of slides 145 traveling in guide ways 146 (Figs. 25 and 26) formed in guide members 147. Guide members 147 are supported from spaced side plates 150 as later described. Side plates 150 are supported on standards 116 by studs 151, spacing collars 152 being positioned on the studs between the standard 116 and side plates 150. Rearwardly extending frame members 153 are secured at their forward ends to the side plates 150 by bolts 154 and are supported adjacent their rear ends by brackets 155 (Fig. 1) secured to standards 156. The forward ends of guides 147 are riveted or otherwise secured as at 148 to the lower ends of vertical frame members 157 and the rear ends of the guides are similarly secured to the lower ends of vertical frame members 164 (Fig. 25) bolted at 159 to brackets 160 riveted to longitudinal member 153. Spacing collars 161 (Fig. 26) on bolts 159 hold members 164 properly spaced from the brackets and in the same vertical plane as member 157.

The slides 145 are connected together by one or more cross rods, one of which is shown in section at 162 in Fig. 25, and the forward ends of slides 145 are provided with handles 163 by either of which the slides 145 may be drawn forwardly in the guides 146. Forward movement of the slides carries the pipe 138 with it, support 140 swinging to the dotted line position in Fig. 1. Forward movement of slides 145 is limited by adjustable stop members 165 secured to the rear ends of the slides and adapted to engage the end of guide 147 as shown in dotted lines in Fig. 1. The pipes 138 are supported intermediate their ends by rollers 166 journaled in depending brackets 167, riveted or otherwise secured to the ends of frame members 153. Preferably the pipes 138 are interrupted by tanks 168 for containing gasoline or other solvent to render the rubber coating of the bead wires tacky. The tanks are provided with felt wipers 169 for applying the solvent to the beads as the latter pass between them.

From the forward ends of the pipes 138 the bead wires pass through guide blocks 170 bolted at 171 to slides 145 and over elongated plates 172 secured to the bottoms of the blocks 170 (Figs. 27 and 28) to a carriage generally indicated at 174, slidably mounted on slides 145.

Carriage 174 comprises side members 175 provided with grooves 176 (Fig. 29) engaging guides 177 secured to slides 145. The forward movement of the carriage with respect to slides 145 is limited by the engagement of a pin 178, carried on one of the members 175, with a stop member 179 secured to the adjacent slide 145. The side members 175 are connected by cross members 180 and 181, the latter being in the form of a cam roll for actuating the bead cutters as later described. Members 175 are channeled as at 184 for the passage of the bead wires and these channels are entered by pawls 185 and 186 which engage the bead wires and prevent rearward movement of the latter while permitting them to be drawn freely forward. Pawls 185 are pivoted at 187 in blocks 188 secured to slides 145, the blocks being connected by a cross brace 189. Pawls 186 are pivoted on removable pins 190 in the side members 175 of the carriage 174, and are provided with weight arms 191 which cause the pawls to positively engage the wires. As will be evident from Figs. 27 and 28 as slides 145 are drawn forward (by handles 163) the set of pawls 186 act to draw the bead wires forward. After slides 145 reach their limit of forward movement, carriage 174 is moved forward on guides 177 as later described. During the forward movement of the carriage pawl 186 draws the wire forward with the carriage, the wire passing under pawl 185 which is now stationary. When carriage 174 is moved rearwardly on guides 177, pawl 185 (still stationary) prevents the wire moving backwardly with the carriage with the result that the carriage passes backwardly over the stationary wire and the wire is projected beyond the end of the carriage an amount equal to the rearward movement of the carriage relative to slides 145, that is until the pin 178 on side members 175 strike the blocks 188.

Means for severing the bead material are mounted in the forward end of carriage 174. As best shown in Figs. 28 and 30 the cutters comprise bevel-ended cutters 192 substantially square in cross section, slidably mounted in openings 193 formed in members 175 and intersecting the bead channels 184. The channels 184 are narrowed as indicated at 194 where the cutters cross them and hardened cutting blocks 195 are set in the channel walls in position to cooperate with the cutting edges of the members 192. The cutting members 192 are reciprocated from the position shown in Fig. 30 to the position of Fig. 28 to sever the beads by means of cam grooves 196 formed in roll 181, previously mentioned. The inner ends of cutters 192 are provided with blocks 197 carrying pins 198 following in grooves 196, which as shown in Fig. 30, are outwardly inclined to move the cutters outwardly and across the bead channels when the roll 181 is rotated. A handle 199 is provided by which the cam roll may be operated.

The forward end of channels 184 are provided with tapered guide spouts 200 secured to the ends of members 175 by machine screws 201. As shown in Fig. 27, and in dotted lines in Fig. 1, guide spouts 200 deliver the bead wires into substantial tangency with the surface of the drum 10, when both the slides 145 and carriage 174 are in extended position.

For rolling the beads onto the tire fabric on the drum as later more fully described, a pair of flanged bead rolls 210 are rotatably mounted on the ends of a shaft 211. The shaft 211 is centrally pivoted on a stud 212 fixed to a shaft 213 journaled in bracket 214 projecting from the ends of members 175. A handle 215 is bolted at 216 to shaft 211 by which the operator presses the rolls 210 against the heads as the latter are drawn onto the drum. The pivotal mounting of the shaft 211 on stud 212 permits the bead rolls to tilt as when fabric splices are encountered. When not in use the rotatable mounting of shaft 213 permits the bead rolls to be "folded" back on the carriage 174 as shown in Fig. 25. As shown in the latter figure the projected portion of the bead material B rests on plates 217 secured to slides 145.

The tread material is supplied from rolls and as shown the machine is adapted to supply either a two piece tread as shown in Fig. 22 or a one piece tread as in Fig. 23. Assuming for the present that the two piece tread is being employed, the wide strip c is supplied in the form of a web C from a roll 220 mounted on standards 156. The web C is wound in a liner H and the liner and web are drawn from the roll 220 around a roll 221 upon which the liner is wound, the web C passing around a driven roll 222 and over a guide roll 223 rotatably mounted in frame members 153 to a tread guide generally indicated at 225. The narrow tread strip d is similarly supplied in the form of a web D from a roll 226 mounted on standard 227. The web D is wound in a liner H and the liner and web are drawn from roll 226 around a roll 228 upon which the liner is wound. The web D passes downwardly around a driven roll 229 and upwardly between guide rolls 230 rotatably mounted in frame members 153 to tread guide 225. In order to properly position the web C a pair of spaced guide bars 234 (Figs. 24 and 34) are mounted for transverse adjustment on the rods 232, the bars being simultaneously moved toward or from each other by a shaft 235 rotatably mounted in lugs 236 secured to side members 231 and reversely treaded in lugs 237 secured to bars 234. Shaft 235 is provided with a hand wheel 238 to facilitate adjustment of the bars.

Similarly, to properly position the web D, the upper set of rods 233 are provided with guide bars 240 adjustable toward and from each other by means of shafts 241 rotatably mounted in lugs 242 secured to side members 231 and reversely threaded in lugs 243 secured to guide bars 240. Shafts 241 are provided with operating hand wheels 244.

From guide 225 the webs C and D pass in superposed relation onto a guide 245 pivotally connected at 239 to the forward end of guide 225.

Guide 245 comprises side members 246 slidably mounted, as best shown in Figs. 25 and 26 in guide members 247 secured to frame members 164 and 157 to which guides 147 are secured as previously described. The forward ends of guide members 247 are secured to the bolts 154 thus supporting the frame made up of guides 147, members 157, 164 and guide members 247 (Fig. 25) from side plates 150, spacers 158 are positioned on bolts 154 between guide members 247 and frame members 153 (Fig. 26) which are also supported on the bolts 154.

Members 246 are connected by a plurality of rods 248 over which the tread passes. The forward end of guide 245 is provided with short guide members 249 slidably mounted on a rod 250 and adapted to be adjusted toward and from each other by a central nut member 251 in the ends of which are engaged reversely threaded screws 252 fixed to the members 249.

The side members 246 are provided at their forward ends with outwardly flaring extensions 255 to which are secured handles 256 by which the guide 245 may be drawn outwardly to a point of substantial tangency with drum 10 for delivery of the tread to the surface of the drum. As guide 245 is drawn forward it draws guide 225 with it and to facilitate movement of the latter it is supported (Fig. 1) on rolls 257 rotatably mounted in the upper ends of members 155. When the tread guides are in their forward or delivery position web C passes to guide 225 over an auxiliary roll 258 as shown in dotted lines in Fig. 1.

The tread is pressed onto the tire carcass by a tread roll 260 (Figs. 31–33) rotatably mounted in the forks 261 of a forked member 262. The ends of the forks are pivotally connected at 263 to the ends of arms 264 which in turn are pivoted at 265 to the outer ends of supporting members 266. Members 266 are secured (Fig. 25) at their rear ends to frame member 164 by bolt 159 and intermediate their length to member 157. The connection of members 266 to frame member 157 is by means of bolts 267 passing through slots 268 in members 157 permitting vertical adjustment of members 266. Screws 269 threaded in blocks 270 secured to the upper ends of frame members 157 and engaging the top of members 266 facilitate the accurate adjustment of the members.

Arms 264 are adapted to be swung about their pivots 265 to move the roll 260 from the inoperative position shown in Figs. 1 and 31 to the operative position of Fig. 33, and means are provided for releasably locking the arms in both of these extreme positions. As shown this locking means comprises members 275 pivoted to the arms 264 at 276 and provided with handles 277. Members 275 are slotted as at 278, the slots being provided adjacent their ends with recesses 279. Brackets 280 fixed to members 266 are provided with pins 281 riding in slots 278 and engageable in recesses 279 to hold arms 264 in either of their extreme positions. As shown in Fig. 31 pins 281 are engaged in the recesses 279 adjacent arm 264 retaining the roll in inoperative position. Clockwise rotation of handles 277 raise members 275 as shown in Fig. 32, to release pins 281 from the recess, permitting arms 264 to be swung to their operative position shown in Fig. 33, in which members 275 are moved counterclockwise to engage pins 281 in the recesses 279 at the free end of member 275. In operative position the fork 262 serves as a handle by which the operator presses the roll against the tread, the members 264, 275 and 280 forming a rigid supporting frame.

To facilitate movement of the tread roll to and from operative position (Figs. 1 and 33), its supporting frame is counter-balanced by weights 285 connected to chains 286 which passes over free sprockets 287, journaled in plates 150, and are connected to arms 288 secured to members 264 at 289.

The rolls 113, 222 and 229 about which the fabric and tread strips pass to the several guiding members, as previously described, are connected together by a sprocket chain 290 (Fig. 1) and are constantly driven by a sprocket chain 291 from sprocket 292 driven by gearing 293 from the power plant in casing 12.

The operation of the machine as a whole will now be briefly described.

With the drum and fabric lappers in the relative position shown in Fig. 12, pedal 120 is depressed to move the fabric feed forward into the dotted line position shown in Fig. 1. The operator then draws the end of the fabric strip forward onto the drum and pressing it against the surface of the drum depresses pedal 41 causing the drum to rotate at low speed to wind the fabric onto the drum. The clip 300 (Fig. 2) assists the operator in holding the end of the fabric strip on the drum. As the fabric is drawn onto the drum it is tightened against the driven roll 113 which thus assists in drawing the material from the roll 110. When the desired amount of fabric has been wound on the drum the operator stops the drum and tears or otherwise severs the wound portion from the strip. The table 114 is then returned to the position shown in full line in Fig. 1. The rearward movement of the table slackens the fabric at roll 113, thus releasing the feeding action of said roll.

In Fig. 13 a single ply of fabric $a$ is shown wound on the drum, the edge portions of which overlie lapping members 14 and 15.

As the next step the operator draws forward the bead guiding slide 147 by means of handle 163 and by means of handle 215 draws forward carriage 174 to position rolls 210 over the extending ends of the head wires, as shown in Figs. 14 and 27. The drum is then set in slow motion to draw two or more convolutions onto the drum on top of the fabric and overlying bead grooves 13 into which the bead material and underlying fabric is pressed by rolls 210. When the desired amount of bead material has been wound on the drum, handle 199 is swung forward to sever the bead material and carriage 174 and slide 145 are then returned to inoperative position. As indicated at 301 in Fig. 2, small squares of square woven fabric are applied to the carcass fabric on the drum, prior to the application of the beads, in position to be wrapped around the severed ends of the bead lengths $b$ after the latter have been severed.

Arm 76 is now raised from the position shown in Fig. 5 to that shown in Fig. 19 permitting follower head pin 72 to engage in groove 73. The drum is now placed in high speed rotation causing lapping cylinder 14 to move from dotted line position, Fig. 15, to the full line position in that figure, lapping the marginal portion of the fabric over the bead members and onto the central portion of the fabric. As member 14 reaches the limit of its advance, heads 88 are coupled between fingers 90 and upon the return of member 14, member 15 is in turn drawn over the drum, as shown in Fig. 16, lapping the other marginal portion over the adjacent bead elements and into overlapping relation with the edge of the previously folded portion. A two ply carcass is thus produced.

The drum 10 is now brought to rest and members 14 and 15 are uncoupled by actuation of handle 98, member 15 being drawn by hand to the outer end of shaft 11 as shown in Figs. 17.

The tread guide 245 is drawn into operative position with the drum by handles 256 and the tread and side wall strip applied to the carcass by means of roll 260 as shown in Fig. 17.

The drum 10 is collapsed as previously described and the finished tire removed by way of the space $x$ between member 15 and the drum, Fig. 17. Member 15 is then returned to the initial position shown in Fig. 12 and the machine is ready for the construction of another tire.

I claim:

1. In a tire building machine which includes a rotatable shaft, power means for rotating the shaft and a building drum mounted on the shaft for rotation therewith; a pair of open-ended cylindrical members slidably mounted on the shaft on opposite sides of the drum for rotation therewith and normally positioned with their free edge portions overlapping the adjacent edge portions of the drum, a plurality of guide devices mounted in superposed relation at the rear of the drum and independently movable along converging paths into substantially tangential relation with the surface of the drum for respectively and successively presenting the ends of lengths of carcass fabric, bead material and tread material to the drum to be wound thereon, means to move one of said cylindrical members toward and over the drum to lap one edge portion of the fabric onto the central portion of the fabric and to return said member to initial position, means for releasably connecting the other cylindrical member to the first member to cause the second member to be drawn over the drum as the first member returns to initial position to thereby lap the other edge portion of the fabric onto the central portion, and means to release the cylindrical members from each other.

2. In a tire building machine which includes a rotatable shaft, power means for rotating the shaft and a building drum mounted on the shaft for rotation therewith; a pair of open-ended cylindrical members slidably mounted on the shaft on opposite sides of the drum for rotation therewith; a plurality of guide members mounted in superposed relation at the rear of the drum and independently movable along converging paths into substantially tangential relation with the surface of the drum for respectively and successively presenting the ends of lengths of carcass fabric, bead material and tread material to the drum to be wound thereon, means to reciprocate one of said cylindrical members to and from telescoping relation with the drum complementary coupling elements carried by the cylindrical members and engaging each other when the first member reaches the limit of its telescoping movement to automatically couple the members together to draw the second member into telescoping relation with the drum as the first member returns to initial position, and means to release said coupling members.

3. In a tire building machine which includes a rotatable shaft, power means for rotating the shaft and a building drum mounted on the shaft for rotation therewith; a pair of open-ended cylindrical members positioned on opposite sides of the drum and slidably mounted on the shaft for rotation therewith, a guiding device for feeding a strip of fabric to the drum to be wound thereon with the edges of the strip overlapping the cylindrical members, a second guiding device for feeding two strips of bead material to the drum and onto the fabric in spaced relation with each other and with the edges of the fabric, means to successively move said cylindrical members to and from telescoping relation with the drum to successively lap the edge portions of the fabric over the bead elements and onto the portion of the fabric intermediate the beads, and a third guiding device for feeding a strip of tread and sidewall material to the drum and onto the lapped fabric, said three guiding devices being mounted in superposed relation at the rear of the drum and independently movable along converging paths, from inoperative positions remote from the drum to feeding positions substantially tangential with the surface of the drum.

4. In a tire building machine which includes a rotatable cantilever shaft, power means for rotating the shaft and a collapsible building drum mounted on the shaft for rotation therewith; outer and inner open-ended cylindrical members slidably mounted on the shaft for rotation therewith on opposite sides of the drum, and normally positioned with their free edge portions overlapping the adjacent edge portions of the drum, a spring actuated detent preventing movement of the outer member from normal position in a direction away from the drum, means to move one of said members to and from telescoping relation with the drum, means to couple the outer member to the inner member when the latter is in telescoped relation with the drum to cause the outer member to be drawn into telescoped relation with the drum as the inner member returns to normal position and means to simultaneously release the coupling means and said spring actuated detent to permit the outer member to be moved to the outer end of the shaft and in spaced relation with the drum.

5. In a tire building machine which includes a rotatable shaft, a building drum mounted on the shaft for rotation therewith, a pair of open-ended cylindrical members slidably mounted on the shaft for rotation therewith and normally positioned with their free edge portions adjacent the edge portions of the drum, means to move one of said members to and from telescoping relation with the drum, and means to releasably couple the members together to cause the second member to move into telescoping relation with the drum as the first member is returned from telescoping position.

6. In a tire building machine, a rotatable building drum, a pair of cylindrical members mounted on opposite sides of the drum for movement to and from telescoping relation with the drum, and means to releasably couple said members together in a fixed predetermined spaced relation for simultaneous movement in the same direction with respect to the drum.

CHARLES H. DESAUTELS.